United States Patent [19]

Walton

[11] 3,998,767

[45] Dec. 21, 1976

[54] FAST CURING OF ARYLENE SULFIDE POLYMER USING HEXAMETHOXYMETHYLMELAMINE

[75] Inventor: Roger J. Walton, Bartlesville, Okla.

[73] Assignee: Phillips Petroleum Company, Bartlesville, Okla.

[22] Filed: Sept. 2, 1975

[21] Appl. No.: 609,635

[52] U.S. Cl. .......................... 260/2.5 D; 260/2.5 R; 260/42.17; 260/42.18; 260/42.27; 260/900; 260/42.29
[51] Int. Cl.² .......................................... C08J 9/10
[58] Field of Search ................ 260/79, 79.1, 2.5 R, 260/2.5 D, 2.5 F

[56] References Cited

UNITED STATES PATENTS

| | | | |
|---|---|---|---|
| 3,282,865 | 11/1966 | Spencer | 260/2.5 F |
| 3,354,129 | 11/1967 | Edmonds, Jr. et al. | 260/79 |
| 3,699,087 | 10/1972 | Wood et al. | 260/79 |
| 3,776,880 | 12/1973 | Blackwell | 260/37 R |
| 3,879,355 | 4/1975 | Blackwell | 260/79 |

*Primary Examiner*—Morton Foelak

[57] ABSTRACT

Hexamethoxymethylmelamine is incorporated into arylene sulfide polymer. The resulting composition is precured to give a polymer of improved processability and/or applied to a substrate and cured under less severe conditions than would be required without the additive. Alternatively, high temperature processing can be utilized to give a foamed product.

15 Claims, No Drawings

FAST CURING OF ARYLENE SULFIDE POLYMER USING HEXAMETHOXYMETHYLMELAMINE

BACKGROUND OF THE INVENTION

This invention relates to improving the characteristics of arylene sulfide polymer compositions.

It is known that arylene sulfide polymers are useful in coating applications. Coatings formed thereof are strong, heat stable and resistant to most industrial chemicals and fumes. Thus, for example, arylene sulfide polymers can be advantageously employed as coating for metals such as steel, aluminum, nickel, brass, copper, as well as ceramics, glass and other substrates stable at the curing temperature required for the coating which can run as high as 800° F. (427° C.).

Arylene sulfide polymer is also ideally suited for other molding techniques such as extrusion and injection molding. However, in many instances the polymer as produced, while having a very high melting point, nonetheless has an extremely low melt viscosity with the melt flow number (MFN) as measured by ASTM D 1238-65T (modified to use a 5 kilogram weight and a temperature of 288° C.) being greater than 2500 g in 10 minutes. To be usable in most applications, a melt flow in the range of only 1–200 is generally required.

It is known that the cure rate can be increased to some extent through the use of various additives as shown for instance by Blackwell U.S. Pat. No. 3,879,355. However, even with such accelerators, a substantial time at an elevated temperature is required to effect significant changes in the melt flow characteristics. Some materials which might be thought of as crosslinking agents have little or no effect on arylene sulfide polymers and may even cause an increase in melt flow. Thus, it would be desirable to find a promoter to cut the time and/or temperature required, and at the same time be usable at low levels so as to avoid side effects on other properties of the polymers.

BRIEF SUMMARY OF THE INVENTION

It is an object of this invention to provide an improved arylene sulfide polymer coated substrate; it is yet a further object of this invention to provide coating compositions comprising arylene sulfide polymer having enhanced processability, coating flexibility, and coating adherence; it is yet a further object of this invention to provide arylene sulfide coating compositions which can be cured at a relatively fast rate to form good, adherent, flexible coatings for metal and other materials without subjecting same to undesirably high temperatures; it is still yet a further object of this invention to provide an arylene sulfide polymer composition having improved processability; and it is still yet another object of this invention to provide foamed arylene sulfide polymer parts and coated articles.

In accordance with this invention, arylene sulfide polymer is mixed with hexamethoxymethylmelamine and subjected to heat.

DESCRIPTION OF THE PREFERRED EMBODIMENTS

The invention is applicable for use with any normally solid, heat curable, high molecular weight arylene sulfide polymer. The preferred arylene sulfide polymer is poly(phenylene sulfide)(PPS) having a melting or softening point of at least 300° F. (149° C.), preferably 400° F. (204° C.) to 850° F. (454° C.). Such polymer can be made in accordance with Edmonds et al U.S. Pat. No. 3,354,129, Example I for instance, the disclosure with patent is hereby incorporated by reference. The preferred polymers have an inherent viscosity in chloronaphthalene at 206° C. of at least 0.1, preferably between 0.1 and 0.3, more preferably between 0.13 and 0.23. A particularly preferred polymer is poly(phenylene sulfide) having a melt flow of from 50 to about 2600 (limit of the instrument measurement by ASTM D 1238-65T, modified to use 5 kilogram weight and a temperature of 288° C.). This melt flow is measured in terms of MFN (melt flow number) which is the grams of polymer flowing from an orifice in 10 minutes. The virgin PPS which normally may have a melt flow number of above 2500 can be precured by heating in air at 500° to 520° F. (260° to 271° C.) for 1–6 hours to lower the initial melt flow for instance to the range of about 50 to 250.

The hexamethoxymethylmelamine which can be used in accordance with this invention to modify the curing of poly(arylene sulfide) has the formula

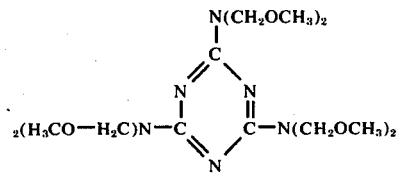

which can be made readily from melamine and formaldehyde.

The additive of this invention can be incorporated into the polymer prior to curing in any convenient manner. Thus, for example, the additive can be added as such to the polymer and the resulting mixture can be agitated in any convenient manner to achieve good mixing. A particularly convenient manner of introducing the additives into the polymer is the addition of the additive dissolved in a volatile solvent such as hexane, benzene, acetone and the like to the polymer in powder form with subsequent volatilization of the solvent. Alternatively, the additive dissolved in said solvent can be ball milled with powdered polymer. Preferably, the additive is incorporated by melt blending as for instance by introducing the additive along with the polymer into a pelletizing extruder where the time for melt blending is the sole time employed for subjecting the polymer and additive to an elevated temperature to effect the cure.

There are three broad aspects to this invention.

First, the additive of the invention is useful in accelerating the cure of virgin arylene sulfide polymer which has a melt flow too high to be useful in such applications as injection molding (precuring). Such polymer can be heated in air after incorporation of the hexamethoxymethylmelamine at a temperature of about 490° F. (254° C.) to 600° F. (316° C.), preferably 550° to 570° F. (288° to 299° C.) for 1 to 10, preferably 2 to 6, hours to lower the original melt flow. Incorporation of an effective cure accelerating amount of the additive of this invention allows for reduction in the time required to effect this lowering of melt flow or, in the alternative, allows further reduction in melt flow for a given time. Thus, for instance, a polymer with a melt flow of 2500 or greater which is not suitable for fabrication operations such as injection molding can be heated after incorporation of the additive for a time within the range of 0 to 4 hours, preferably 0 to 1 hour. The heating time after incorporation of the additive can be zero because, as noted hereinabove, one of the surprising aspects of this invention is the ability of the hexamethoxymethylmelamine additive to effect substantial cure during the melt blending itself. Generally, this melt blending will subject the additive to contact with the arylene sulfide state for a time within the range of 1 to 30, preferably 2 to 5, minutes at a temperature of 545° to 600° F. (285° to 316° C.), preferably 550° to 575° F. (288° to 299° C.) to effect the cure in this manner. Different combinations of these techniques can be used. For instance, the polymer from the melt blending can be used as is or can be subjected to additional curing prior to use. Also, in either event, the virgin polymer can be partially precured prior to incorporation of the additive. Some leeway in the extrusion temperature is possible so long as it is above the melting point of the polymer and below the decomposition point of the hexamethoxymethylmelamine. Temperatures up to about 700° F. (371° C.) can be used if it is desired to extrude a foamed product.

Thus, in accordance with the first aspect of this invention, a virgin polymer with a melt flow of 50 to above 2500 which is unsuitable for many applications can be made suitable for such applications after a relatively short curing time by utilizing the additive of this invention.

In accordance with the second aspect of the invention, the additive is incorporated into arylene sulfide polymer which is applied to a substrate and heated to give a tough, chemical-resistant coating (curing). This allows reduction of the curing temperature from the normal level which can run as high as 800° F. (427° C.) down to within the range of 490° to 600° F. (254°–316° C.), preferably about 550° to 570° F. (288° to 299° C.). The temperature obviously is related to the particular polymer utilized and to the time, of course, but in any event the time for achieving a cure sufficient to give a good coating can be reduced preferably at least 180° F. (100° C.) below the temperature required to give a coating of similar quality without the additive. Similarly, at a given cure temperature, the cure time can be reduced at least 10 minutes below the time required to give a coating of similar quality without the additive. The curing time will generally be from 1 to 40 minutes, preferably 5 to 30 minutes. In addition to decreasing the cure time and/or temperature required, the coatings made in accordance with the invention can have increased flexibility.

Thus, in accordance with this second aspect of the invention, the time and/or temperature required to cure a coating on a substrate can be reduced so as to allow coating of many substrates which would be adversely affected by the higher temperature and/or curing time. In fabricating pipe, for instance, the exposure of a substrate for long periods of time at high temperatures is undesirable because metal has a tendency toward embrittlement under such severe conditions.

In accordance with the third aspect of this invention, the formed articles or coated substrates made with the arylene sulfide polymer/hexamethoxymethylmelamine composition of this invention are heated to 605° to 700° F. (318° to 371° C.), preferably 610° to 675° F. (321° to 357° C.) for a time of 0.1 to 30, preferably 1 to 10, minutes to give a foamed product.

In addition to the additive of this invention, the compositions of this invention can contain other ingredients conventionally employed in arylene sulfide polymer compositions. For instance, fillers such as titanium dioxide, calcium carbonate, aluminum oxide, aluminum silicate, pigments, resins and/or plasticizers, ferric oxide, silicon dioxide, asbestos fibers, glass fibers, poly(tetrafluoroethylene), and the like can be present. Preferably, the coating compositions will contain, based on 100 parts by weight polymer, 10 to 50 parts by weight of a filler or pigment such as titanium dioxide and/or poly(tetrafluoroethylene).

When arylene sulfide polymer compositions in accordance with the invention are used as coating materials, the coatings can have a thickness of 0.25 to 25 mils. It is also within the scope of this invention to utilize a plurality of layers of the polymeric composition with the material being cured or at least partially cured between each coat. Preferably, the total thickness will be in the range of 0.5 to 50 mils. The invention has been found to be of particular utility in the production of relatively thin coatings, that is, coatings in which each layer has a thickness of about 0.5 to 5 mils.

The additive of this invention is employed in an amount within the range of 0.05 to 10, preferably 0.1 to 5, more preferably 0.1 to 1, weight percent based on the weight of the arylene sulfide polymer.

EXAMPLE I

PPS pellets previously precured by conventional heat treatment from a melt flow above 2500 to a melt flow (ASTM D 1238-70 at 288° C., 5 kg wt.) of 90 g/10 minutes were blended in an extruder pelletizer with varying amounts of hexamethoxymethylmelamine (Cymel 300, Am. Cyanamid). After compounding and pelletizing at 550° F. (288° C.) and a residence time of about 5 minutes, the samples were subjected to oven curing at 232° C. and 260° C., respectively, for various periods of time. The results are given in Table I below:

TABLE I

PPS[1] Curing Study with Various Levels of Hexamethoxymethylmelamine (HMM)[2]

Pelletized Blends
M.F. at 288° C. After Oven Curing at 232° C.

| Wt. % HMM in PPS | Oven Cure Time, hrs. | | | | |
|---|---|---|---|---|---|
| | 0 | ½ | 1 | 2 | 4 |
| 0 | 90 | 58 | 51 | 43 | 30 |
| 0.1 | 23 | 14 | 11 | 9 | 6 |
| 0.5 | 2.7 | 1.9 | 1.5 | 1.3 | 0.9 |
| 1 | 0.7 | 0.2 | 0.1 | 0.1 | 0.1 |
| 5 | 1.2 | 0.4 | 0.3 | N/F[3] | N/F |

M.F. at 288° C. After Oven Curing at 260° C.

| Wt. % HMM in PPS | Oven Cure Time, hrs. | | | | |
|---|---|---|---|---|---|
| | 0 | ½ | 1 | 2 | 4 |
| 0 | 90 | 31 | 16 | 8 | 3 |
| 0.1 | 23 | 7 | 5 | 2.6 | 1.2 |
| 0.5 | 2.7 | 0.9 | 0.8 | 0.3 | 0.04 |
| 1 | 0.7 | 0.06 | 0.08 | N/F | N/F |
| 5 | 1.2 | N/F | N/F | N/F | N/F |

[1]Ryton P-3 resin, Phillips Petroleum Co.
[2]Cymel 300, American Cyanamid Co.
[3]N/F — No flow.

The data show that even at the 0.1 wt. % level, the melt flow drops appreciably even without a post-cure and that at higher levels the dropoff is even more abrupt. In practice, it would be undesirable, from further processing viewpoint, to overcure the resin to no flow, so that the subsequent heat treatment may be completely eliminated with this additive and still have a product of reasonably good flow properties, suitable for injection molding just as a result of the cure imparted during incorporation of the additive and/or subsequent fabrication.

EXAMPLE II

A virgin PPS, melt flow > 2800 g/min. (ASTM D 1238-70 as above) (limit of instrument), was blended in an extruder-pelletizer with 5 wt. % hexamethoxymethylmelamine or with melamine. The pellets were subsequently subjected to a conventional heat treatment at 550° or 600° F. (288° or 316° C.) for 20 minutes and the melt flow was measured again. The blends and results are tabulated below:

TABLE II

| Sample | Curing Conditions | Melt Flow (288° C.) |
|---|---|---|
| PPS Control | none | 2800 g/10 min. |
| PPS Control | 550° F. (288° C.) for 20 min. | 690 g/10 min. |
| PPS + 5% HMM | 550° F. (288° C.) for 20 min. | 33 g/10 min. |
| PPS + Melamine[1] | 550° F. (288° C.) for 20 min. | 1295 g/10 min. |
| PPS Control | 600° F. (315.5° C.) for 10 min. | 933 g/10 min. |
| PPS + 5% HMM | 600° F. (315.5° C.) for 10 min. | 141 g/10 min. |
| PPS + 5% Melamine | 600° F. (315.5° C.) for 10 min. | 2407 g/10 min. |

[1]Eastman Kodak Co.

The data show that hexamethoxymethylmelamine will lower the melt flow of PPS significantly in 20 minutes at 500° F. (288° C.) from >2800 to 33 g/10 min. while melamine retarded the pre-cure. Thus, with no additive the melt flow went from >2800 to 690 g/10 min. while with melamine the melt flow was reduced from >2800 to 1295 g/10 min. under similar conditions.

The resin precured to a melt flow of 33 g/10 min. can be injection molded readily while the completely uncured material is unsuitable for injection molding.

While this invention has been described in detail for the purpose of illustration, it is not to be construed as limited thereby but is intended to cover all changes and modifications within the spirit and scope thereof.

What is claimed is:

1. A composition of matter comprising an arylene sulfide polymer and 0.05 to 10 weight percent based on the weight of said arylene sulfide polymer of hexamethoxymethylmelamine.

2. A composition according to claim 1 wherein said hexamethoxymethylmelamine is present in an amount within the range of 0.1 to 5 weight percent based on the weight of said polymer.

3. A composition according to claim 2 wherein said polymer is poly(phenylene sulfide).

4. A composition of matter comprising an arylene sulfide polymer and an effective cure accelerating amount of hexamethoxymethylmelamine.

5. A method for precuring an arylene sulfide polymer comprising incorporating into said polymer 0.05 to 10 weight percent based on the weight of said arylene sulfide polymer of hexamethoxymethylmelamine
    and heating the resulting composition to a temperature sufficient to lower the melt flow of said polymer.

6. A method according to claim 5 wherein said precuring is carried out solely during melt blending.

7. A method according to claim 6 wherein said melt blending is melt extrusion and said melt extrusion is carried out at a temperature of 545° to 600° F. for a time of 1 to 30 minutes.

8. A method according to claim 7 wherein said melt extrusion is carried out at a temperature of 550° to 575° F. for a time of 2 to 5 minutes.

9. A method according to claim 5 wherein said polymer having said hexamethoxymethylmelamine incorporated therein is heated in air after said incorporation at a temperature of 490° to 600° F. for a time of 1 to 10 hours.

10. A coated article formed by applying a composition comprising an arylene sulfide polymer and 0.05 to 10 weight percent based on the weight of said polymer of hexamethoxymethylmelamine to a substrate and curing said thus-coated substrate at a temperature within the range of 490° to 600° F. for a time within the range of 1 to 40 minutes.

11. An article according to claim 10 wherein said temperature is within the range of 550° to 570° F.

12. An article according to claim 10 wherein said polymer is poly(phenylene sulfide).

13. A method of producing a foamed arylene sulfide polymer comprising incorporating into said polymer 0.05 to 10 weight percent based on the weight of said polymer of hexamethoxymethylmelamine and heating the resulting composition to a temperature within the range of 605° to 700° F.

14. A method according to claim 13 wherein said temperature is 610° to 675° F.

15. A method according to claim 14 wherein said polymer is poly(phenylene sulfide).

* * * * *